US007646574B2

(12) United States Patent
Imura

(10) Patent No.: US 7,646,574 B2
(45) Date of Patent: Jan. 12, 2010

(54) VOLTAGE REGULATOR

(75) Inventor: Takashi Imura, Chiba (JP)

(73) Assignee: Seiko Instruments Inc., Chiba (JP)

( * ) Notice: Subject to any disclaimer, the term of this patent is extended or adjusted under 35 U.S.C. 154(b) by 125 days.

(21) Appl. No.: 12/104,183

(22) Filed: Apr. 16, 2008

(65) Prior Publication Data

US 2008/0265852 A1 Oct. 30, 2008

(30) Foreign Application Priority Data

Apr. 27, 2007 (JP) ............................ 2007-118815

(51) Int. Cl.

| | |
|---|---|
| ***H02H 3/08*** | (2006.01) |
| ***H02H 9/02*** | (2006.01) |
| *H02H 7/00* | (2006.01) |
| *H02H 9/00* | (2006.01) |
| *H02H 9/08* | (2006.01) |
| *G05F 1/00* | (2006.01) |
| *G05F 1/565* | (2006.01) |

(52) U.S. Cl. ....................... 361/93.1; 361/18; 361/93.7; 361/93.9; 323/282; 323/284; 323/274; 323/275

(58) Field of Classification Search ....................... None
See application file for complete search history.

(56) References Cited

U.S. PATENT DOCUMENTS

| | | | | |
|---|---|---|---|---|
| 5,227,714 | A * | 7/1993 | Lou | 323/282 |
| 6,801,419 | B2 * | 10/2004 | Fukui | 361/93.1 |
| 6,867,573 | B1 * | 3/2005 | Carper | 323/277 |
| 6,977,491 | B1 * | 12/2005 | Caldwell et al. | 323/282 |
| 7,564,299 | B2 * | 7/2009 | Shor et al. | 327/540 |

FOREIGN PATENT DOCUMENTS

| | | |
|---|---|---|
| JP | 2003-29856 A | 1/2003 |

* cited by examiner

*Primary Examiner*—Albert W Paladini
*Assistant Examiner*—Dharti H Patel
(74) *Attorney, Agent, or Firm*—Brinks Hofer Gilson & Lione

(57) ABSTRACT

Provided is a voltage regulator having an overcurrent protective circuit, which is excellent in detection precision and small in current consumption. The voltage regulator having the overcurrent protective circuit which detects that overcurrent flows in an output transistor, and limits the current of the output transistor, includes a regulated cascode circuit that makes a voltage at a source of the output transistor equal to a voltage at a source of the output current detection transistor, in which the operating current of the regulated cascode circuit is supplied by a transistor that is controlled by the output voltage of an error amplifier circuit.

7 Claims, 5 Drawing Sheets

VOLTAGE REGULATOR

REFERENCE TO THE RELATED APPLICATIONS

This application claims priority under 35 U.S.C. §119 to Japanese Patent Application No. JP2007-118815 filed Apr. 27, 2007, the entire content of which is hereby incorporated by reference.

BACKGROUND OF THE INVENTION

1. Field of the Invention

The present invention relates to a voltage regulator that outputs a constant voltage, and more particularly to an overcurrent protective circuit that reduces an output current to protect a circuit when an overcurrent flows into an output terminal.

2. Description of the Related Art

Voltage regulators have been employed as voltage supply sources of circuits in diverse electronic devices. The function of the voltage regulator is to output a constant voltage to the output terminal without being affected by a voltage variation of an input terminal. Also, it is important that the voltage regulator functions as overcurrent protection that reduces an output current to protect a circuit when a current that is supplied to a load from the output terminal increases and exceeds a largest current (for example, refer to JP 2003-29856 A).

FIG. 5 shows a circuit diagram showing a voltage regulator having an overcurrent protective circuit. The conventional voltage regulator having the overcurrent protective circuit includes an output voltage divider circuit 2 that divides a voltage at an output terminal VOUT, a reference voltage circuit 3 that outputs a reference voltage, an error amplifier 4 that compares the divided voltage with the reference voltage, an output transistor 1 that is controlled by an output voltage of the error amplifier 4, and an overcurrent protective circuit 100. The overcurrent protective circuit 100 includes an output current detection transistor 5 and a detection resistor 6 which are an output current detector circuit that is connected in parallel to the output transistor 1, and a transistor 7, a resistor 8, and an output current control transistor 9 which constitute an output current limiter circuit that is controlled by a voltage of the detection resistor 6.

The above overcurrent protective circuit 100 has a function of protecting a circuit from the overcurrent with the following operation.

In the case where the output current of the output terminal VOUT increases, the detection current that is in proportion to the output current flows in the output current detection transistor 5. The detection current flows in the resistor 6, thereby allowing a voltage between the gate and the source of the transistor 7 to rise. In this case, when the overcurrent flows in the output terminal VOUT, and the voltage between the gate and the source of the transistor 7 exceeds a threshold voltage due to the detection current that is proportional to the overcurrent, a drain current flows in the transistor 7. Accordingly, the voltage between the gate and the source of the output current control transistor 9 drops, and a drain current flows in the output current control transistor 9, thereby allowing the voltage between the gate and the source of the output transistor 1 to rise. With the execution of feedback as described above, the gate of the output transistor 1 is so controlled as to hold the drain current of the output current detection transistor 5 constant. As a result, an increase in the output current is suppressed.

However, the output current detection transistor 5 of the overcurrent protective circuit 100 suffers from such a problem that because the drain voltage changes according to the input voltage, a relationship of current between the output current detection transistor 5 and the output transistor 1 is collapsed due to the channel length modulation effect, to thereby deteriorate a precision in the detection of the overcurrent.

Accordingly, the overcurrent protective circuit 100 needs to make a voltage $V_A$ at the drain (point A) of the output current detection transistor 5 identical with a voltage $V_B$ at the drain (point B) of the output transistor 1, and uses a current mirror circuit as a circuit for achieving the above requirement.

The operation will be described below. A current of the same amount as that of the detection current flows by the transistor 11 that is identical in size with the output current detection transistor 5. The current is reflexed by a first current mirror circuit, and flows in transistors 14, 15, and 16 that constitute a second current mirror circuit, thereby making the voltage $V_A$ at the point A identical with the voltage $V_B$ at the point B.

However, the circuit using the above current mirror circuit has a drawback that a current consumption increases because the same current as that of the detection current flows in two paths that pass through transistors 11, 15, and 12 and transistors 14 and 13, respectively.

The present invention has been made to solve the above problems, and an object of the present invention is to provide an overcurrent protective circuit that is high in detection precision without increasing the current consumption.

SUMMARY OF THE INVENTION

In order to solve the conventional problems, a voltage regulator having the overcurrent protective circuit according to the present invention is configured as follows. That is, the present invention provides:

(1) a voltage regulator, including: an overcurrent protective circuit including: an output current detection transistor that is controlled by an output voltage of the error amplifier circuit, and allows a detection current to flow therein; a detection resistor that generates a detection voltage by the detection current; an output current limiter circuit that is controlled by the voltage of the detection resistor, and controls the gate voltage of the output transistor; and a regulated cascode circuit that is connected between the drain of the output transistor and the drain of the output current detection transistor, and makes a voltage at the drain of the output transistor equal to a voltage at the drain of the output current detection transistor, in which the voltage regulator, the operating current of the regulated cascode circuit is supplied by the operating current supply transistor that is controlled by the output voltage of the error amplifier circuit.

(2) a voltage regulator, in which the regulated cascode circuit further includes a current limiter circuit that is connected in series to the operating current supply transistor, and the upper limit of the operating current is limited by the current limiter circuit.

(3) a voltage regulator, in which the regulated cascode circuit further includes a minimum operating current supply circuit that is connected in parallel to the operating current supply transistor, and the minimum operating current is compensated by the minimum operating current supply circuit.

According to the voltage regulator having the overcurrent protective circuit of the present invention, since the regulated cascode circuit is used in order to make the voltage $V_A$ at the drain (point A) of the output current detection transistor 5 identical with the voltage $V_B$ at the drain (point B) of the output transistor 1, the current flows in one path as compared with the current mirror circuit. This causes such an advantage that the current consumption can be reduced.

Also, even if there occurs the overcurrent that exceeds the operating current required for the regulated cascode circuit, the operating current is limited. As a result, an unnecessary current is prevented from flowing, thereby making it possible to reduce the current consumption more.

Further, even if the current is lower than the operating current required for the regulated cascode circuit, the minimum operating current can be supplied. As a result, the operation of the regulated cascode circuit is prevented from getting unstable, thereby making it possible to maintain the detection precision.

DETAILED DESCRIPTION OF THE PREFERRED EMBODIMENTS

Now, a description will be given of embodiments of the present invention with reference to the accompanying drawings.

Figure 1:
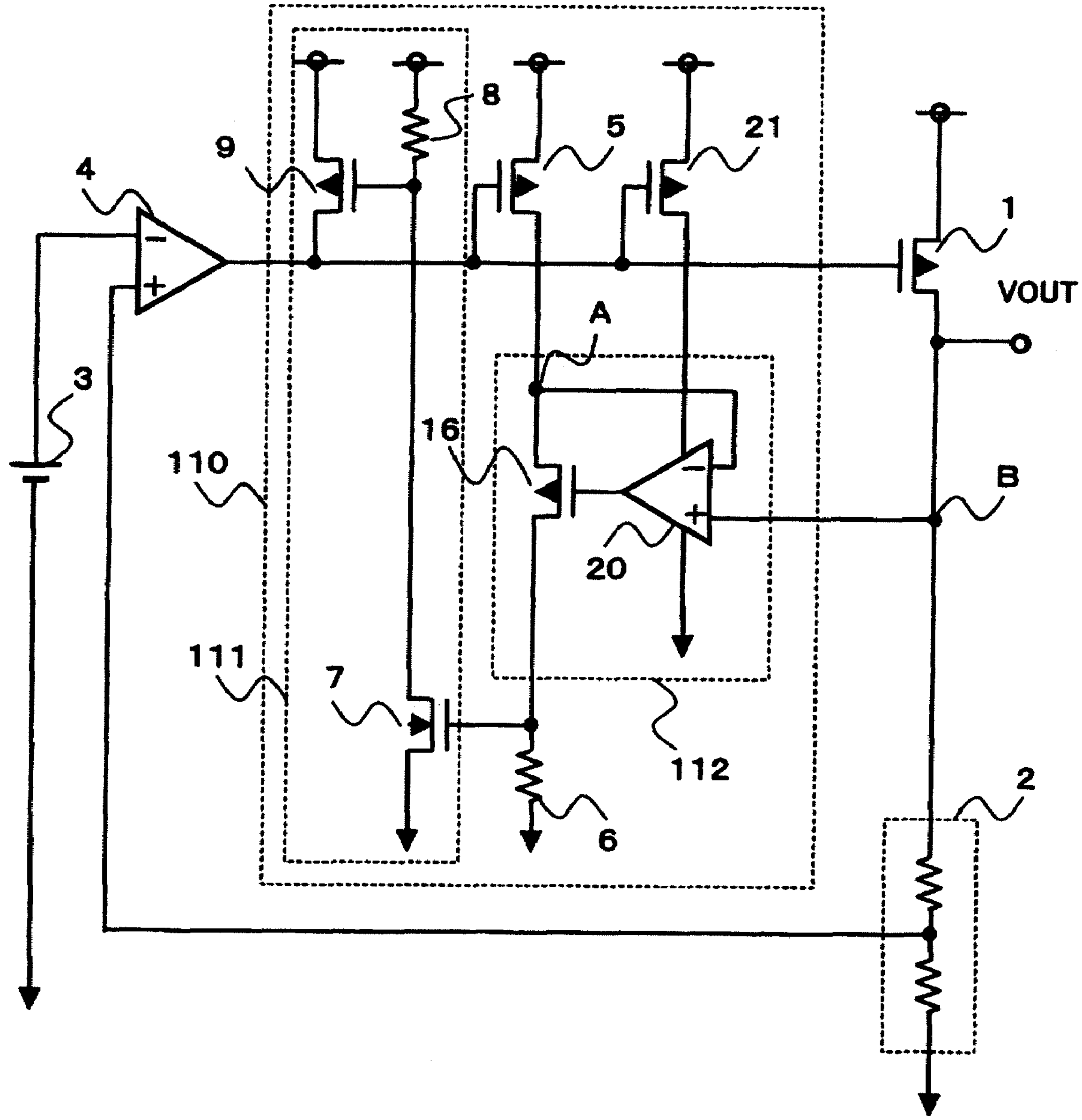
FIG. 1 is a circuit diagram showing a voltage regulator having an overcurrent protective circuit according to an embodiment.

FIG. 1 is a circuit diagram showing a voltage regulator having an overcurrent protective circuit according to this embodiment.

The voltage regulator according to this embodiment includes an output voltage divider circuit 2, a reference voltage circuit 3, an error amplifier 4, an output transistor 1 of the p-type MOS transistor, and an overcurrent protective circuit 110.

The output voltage divider circuit 2 divides the voltage of an output terminal VOUT to output a divided voltage. The error amplifier 4 compares a reference voltage that is output from the reference voltage circuit 3 with the divided voltage. The output transistor 1 is controlled by the output voltage of the error amplifier 4, and has a function of holding the voltage of the output terminal VOUT constant. The overcurrent protective circuit 110 has a function of monitoring a current that flows in the output terminal VOUT to reduce the current in the output transistor 1 upon detection of the overcurrent.

The output voltage divider circuit 2 has an input terminal connected to the output terminal VOUT, and an output terminal connected to a non-inverting input terminal of the error amplifier 4. The reference voltage circuit 3 has an output terminal connected to an inverting input terminal of the error amplifier 4. The error amplifier 4 has an output terminal connected to a gate of the output transistor 1. The output transistor 1 has a source connected to an input power supply, and a drain connected to the output terminal VOUT. The overcurrent protective circuit 110 has two input terminals one of which is connected to the output terminal of the error amplifier 4, and another input terminal of which is connected to the output terminal VOUT. The overcurrent protective circuit 110 has an output terminal connected to a gate of the output transistor 1.

The overcurrent protective circuit 110 includes an output current detection transistor 5 of a p-type MOS transistor, a detection resistor 6, an output current limiter circuit 111, and a regulated cascode circuit 112. The output current limiter circuit 111 includes a transistor 7 of an n-type MOS transistor, a resistor 8, and an output current limit transistor 9 of a p-type MOS transistor. The regulated cascode circuit 112 includes an error amplifier circuit 20, and a transistor 16 of the p-type MOS transistor. A power supply terminal of the error amplifier circuit 20 is connected with an operating current supply transistor 21 of the p-type MOS transistor. Also, the output current detection transistor 5 and the detection resistor 6 constitute an output current detector circuit.

Since the gates of the output current detection transistor 5 and the output transistor 1 are connected to each other, the respective drain currents are proportional to each other. The detection resistor 6 generates a voltage by the aid of the drain current of the output current detection transistor 5. The output current limiter circuit 111 controls the gate voltage of the output transistor 1 by the aid of the voltage that is generated in the detection resistor 6. The regulated cascode circuit 112 has a function of maintaining the voltage $V_A$ at the drain (point A) of the output current detection transistor 5 equal to the voltage $V_B$ at the drain (point B) of the output transistor 1. The operating current supply transistor 21 supplies the operating current to the error amplifier circuit 20 of the regulated cascode circuit 112.

The output current detection transistor 5 has a gate and a source commonly connected to those of the output transistor 1, and also has a drain connected to the source of the transistor 16. The drain of the transistor 16 is connected to GND through the detection resistor 6. A connection point between the drain of the transistor 16 and the detection resistor 6 is connected to the gate of the transistor 7. The drain of the transistor 7 is connected to the input power supply through the resistor 8. The output current control transistor 9 has a gate connected to a connection point between the drain of the transistor 7 and the resistor 8, a source connected to the input power supply, and a drain connected to the output terminal of the error amplifier 4. The error amplifier circuit 20 has a non-inverting input terminal connected to the output terminal VOUT, an inverting input terminal connected to the drain of the output current detection transistor 5, and an output terminal connected to the gate of the transistor 16. The operating current supply transistor 21 has a source connected to the input power supply, a drain connected to the power supply terminal of the error amplifier circuit 20, and a gate connected to the output terminal of the error amplifier circuit 20.

The above overcurrent protective circuit 110 has a function of protecting a circuit from overcurrent with the following operation.

In the case where the output current of the output terminal VOUT increases, the detection current that is in proportion to the output current flows in the output current detection transistor 5. The detection current flows in the resistor 6, thereby allowing a voltage between the gate and the source of the transistor 7 to rise. In this case, when the overcurrent flows in the output terminal VOUT, and the voltage between the gate and the source of the transistor 7 further rises due to the detection current that is proportional to the overcurrent and exceeds a threshold voltage of the transistor 7 of the n-type MOS transistor, a drain current of the transistor 7 flows in the transistor 8. Since the drain current of the transistor 7 flows in the resistor 8, the voltage between the gate and the source of the output current control transistor 9 drops, and the drain current flows in the output current control transistor 9 of the p-type MOS transistor. Accordingly, the drain voltage of the output current control transistor 9 rises to make the voltage between the gate and the source of the output transistor 1 rise. With the execution of feedback as described above, the gate voltage of the output transistor 1 is so controlled as to suppress an increase in the output current.

In this case, the regulated cascode circuit 112 operates as follows. When the voltage $V_B$ at the drain of the output transistor 1 which has been input to the non-inverting input terminal becomes higher than the voltage $V_A$ at the drain of the output current detection transistor 5 which has been input to the inverting input terminal, the output voltage of the error amplifier circuit 20 becomes high. Since the gate voltage of the transistor 16 of the p-type MOS transistor becomes high, and the on-resistance becomes high, the drain voltage $V_A$ of the output current detection transistor 5 becomes high. On the contrary, when the voltage $V_B$ which has been input to the non-inverting input terminal becomes lower than the voltage $V_A$ which has been input to the inverting input terminal, the output voltage of the error amplifier circuit 20 becomes low. Since the gate voltage of the transistor 16 of the p-type MOS transistor becomes low, and the on-resistance becomes low, the drain voltage $V_A$ of the output current detection transistor 5 becomes low. As described above, the error amplifier circuit 20 controls the gate of the transistor 16 so that $V_A=V_B$ is satisfied, that is, the voltages at the drains of the output transistor 1 and the output current detection transistor 5 become equal to each other. As a result, since the output current detection transistor 5 and the output transistor 1 always operate in the same state, it is possible to enhance a precision in the detection of the overcurrent.

Since the gate of the operating current supply transistor 21 is connected to the gate of the output transistor 1, the operating current of the error amplifier circuit 20 is in proportion to the current that flows in the load from the output transistor 1.

When it is unnecessary that the overcurrent protective circuit 110 functions, that is, a current that flows from the output transistor 1 is small, the operating current of the overcurrent protective circuit 110 is also small, so the overcurrent protective circuit 110 is required to function. That is, when the current that flows from the output transistor 1 is large, the operating current of the overcurrent protective circuit 110 is also large.

As described above, in the overcurrent protective circuit of the voltage regulator according to this embodiment, since the regulated cascode circuit 112 is used as a circuit for making the voltage $V_A$ identical with the voltage $V_B$, the current that flows in that circuit flows in only one path of the operating current that flows in the regulated cascode circuit 112. As a result, it is possible to reduce the current consumption as compared with the conventional art using the current mirror circuit.

Figure 2:
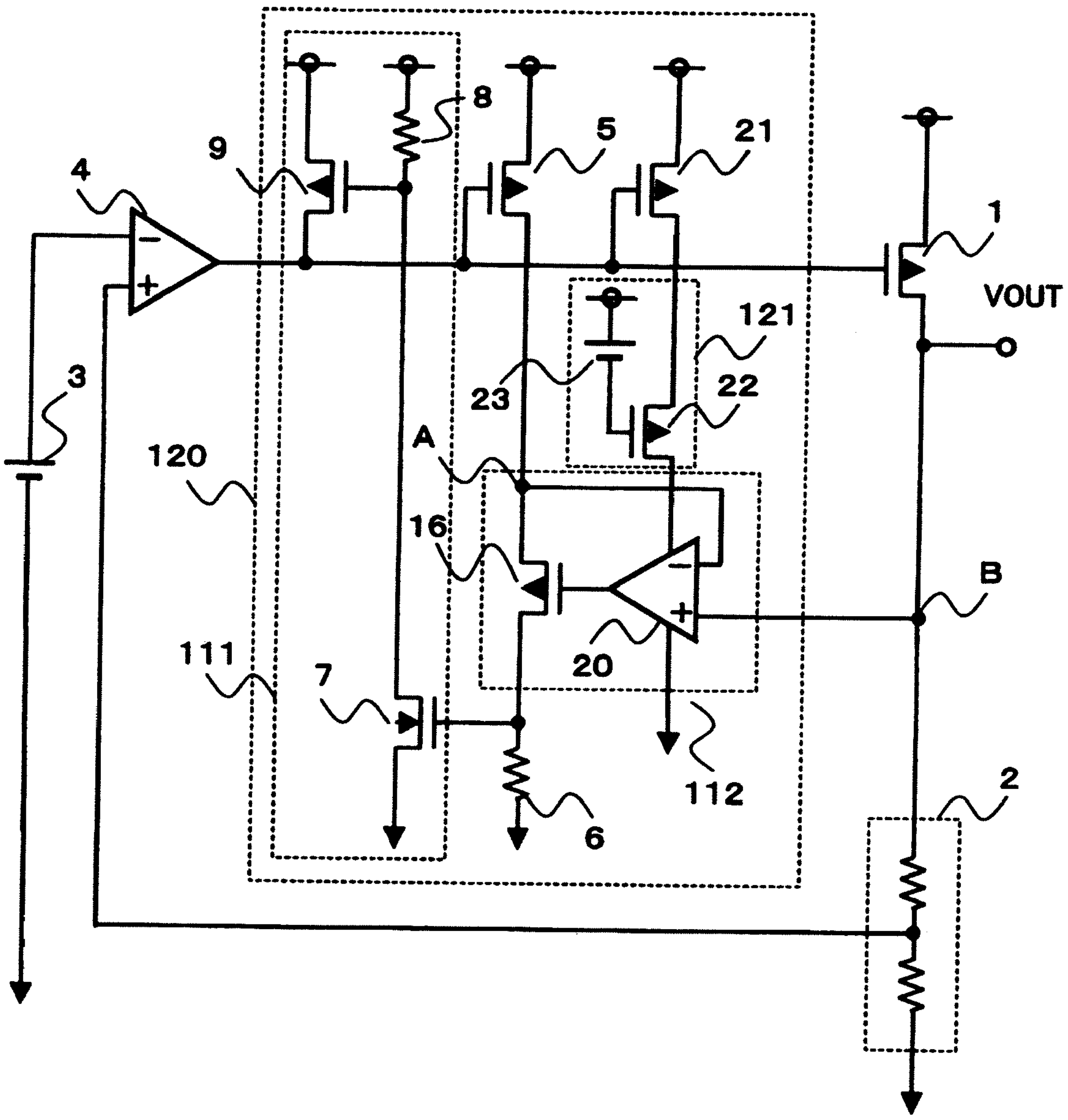
FIG. 2 a circuit diagram showing a voltage regulator having an overcurrent protective circuit according to another embodiment.

FIG. 2 is a circuit diagram showing a voltage regulator having an overcurrent protective circuit according to another embodiment. The voltage regulator shown in FIG. 2 has an operating current upper limiter circuit 121 that provides an upper limit of the operating current of the error amplifier circuit 20 of the regulated cascode circuit 112. The operating current upper limiter circuit 121 is connected in serial with the operating current supply transistor 21 that supplies the operating current to the error amplifier circuit 20.

The operating current upper limiter circuit 121 can be constituted by, for example, a transistor 22 of the p-type MOS transistor having a gate connected to a bias voltage source 23. The operating current upper limiter circuit 121 sets the voltage of the bias voltage source 23 so that the drain current of the transistor 22 becomes the upper limit of the operating current of the error amplifier circuit 20.

With the above configuration of the overcurrent protective circuit, even if the current that flows from the operating current supply transistor 21 becomes overcurrent that exceeds the operating current required for the regulated cascode circuit 112, the current is limited by the operating current upper limiter circuit 121. As a result, the unnecessary current is prevented from flowing, thereby making it possible to realize the overcurrent protective circuit that is smaller in the current consumption.

Figure 3:
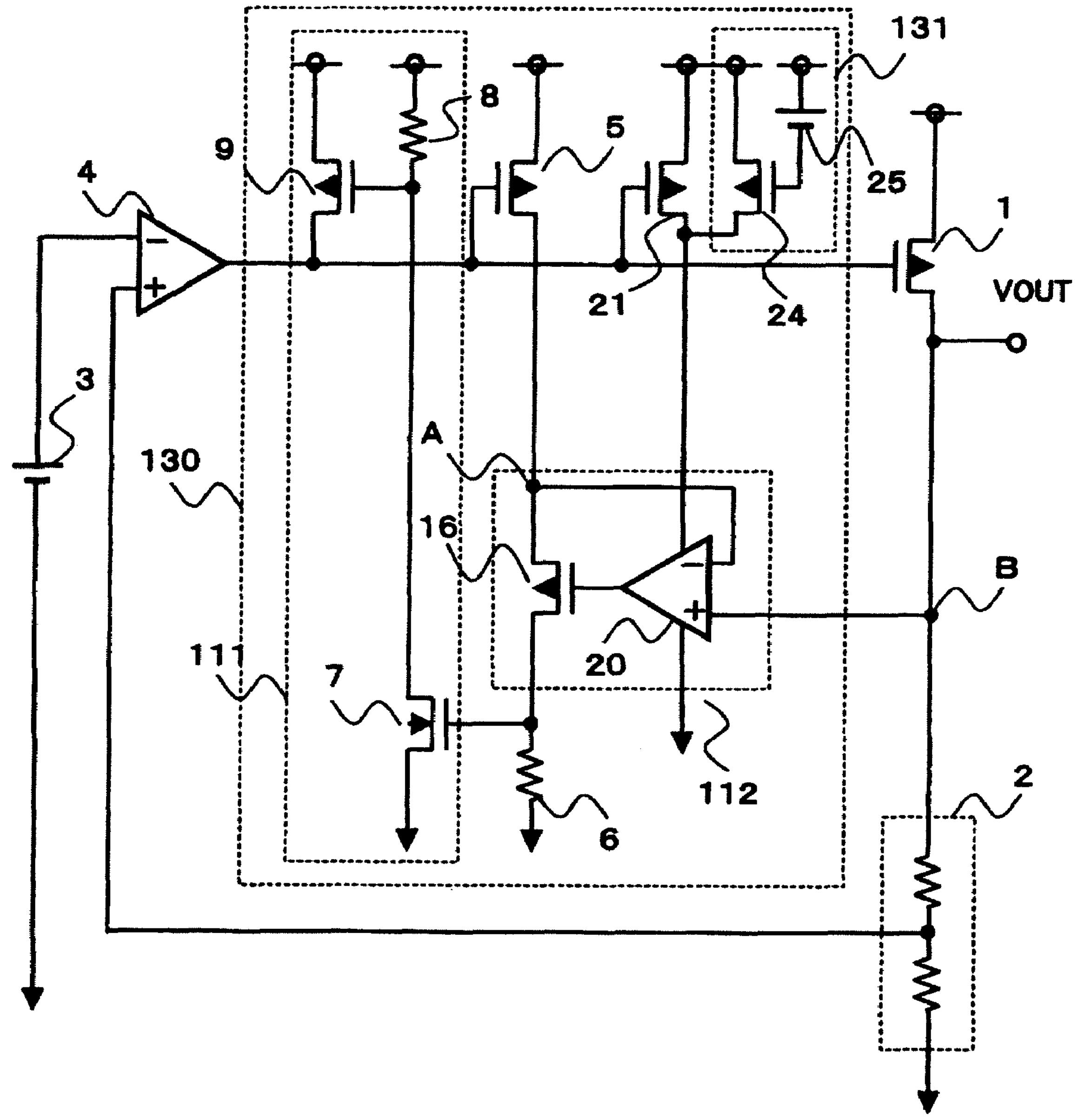
FIG. 3 a circuit diagram showing still a voltage regulator having an overcurrent protective circuit according to still another embodiment.

FIG. 3 is a circuit diagram showing a voltage regulator having an overcurrent protective circuit according to still another embodiment. The voltage regulator shown in FIG. 3 has an operating current lower limiter circuit 131 that provides a lower limit of the operating current of the error amplifier circuit 20 of the regulated cascode circuit 112. The operating current lower limiter circuit 131 is connected in parallel to the operating current supply transistor 21 that supplies the operating current to the error amplifier circuit 20.

The operating current lower limiter circuit 131 can be constituted by, for example, a transistor 24 of the p-type MOS transistor having a gate connected to a bias voltage source 25. The operating current lower limiter circuit 131 sets the voltage of the bias voltage source 25 so that the drain current of the transistor 24 becomes the lower limit of the operating current of the error amplifier circuit 20.

With the above configuration of the overcurrent protective circuit, even if the current that flows from the operating current supply transistor 21 becomes lower than the operating current required for the regulated cascode circuit 112, the minimum operating current can be supplied by the operating current lower limiter circuit 131. As a result, the operation of the regulated cascode circuit 112 is prevented from being unstable, and the output current detection transistor 5 and the output transistor 1 always operate in the same state, thereby making it possible to maintain the detection precision.

Figure 4:
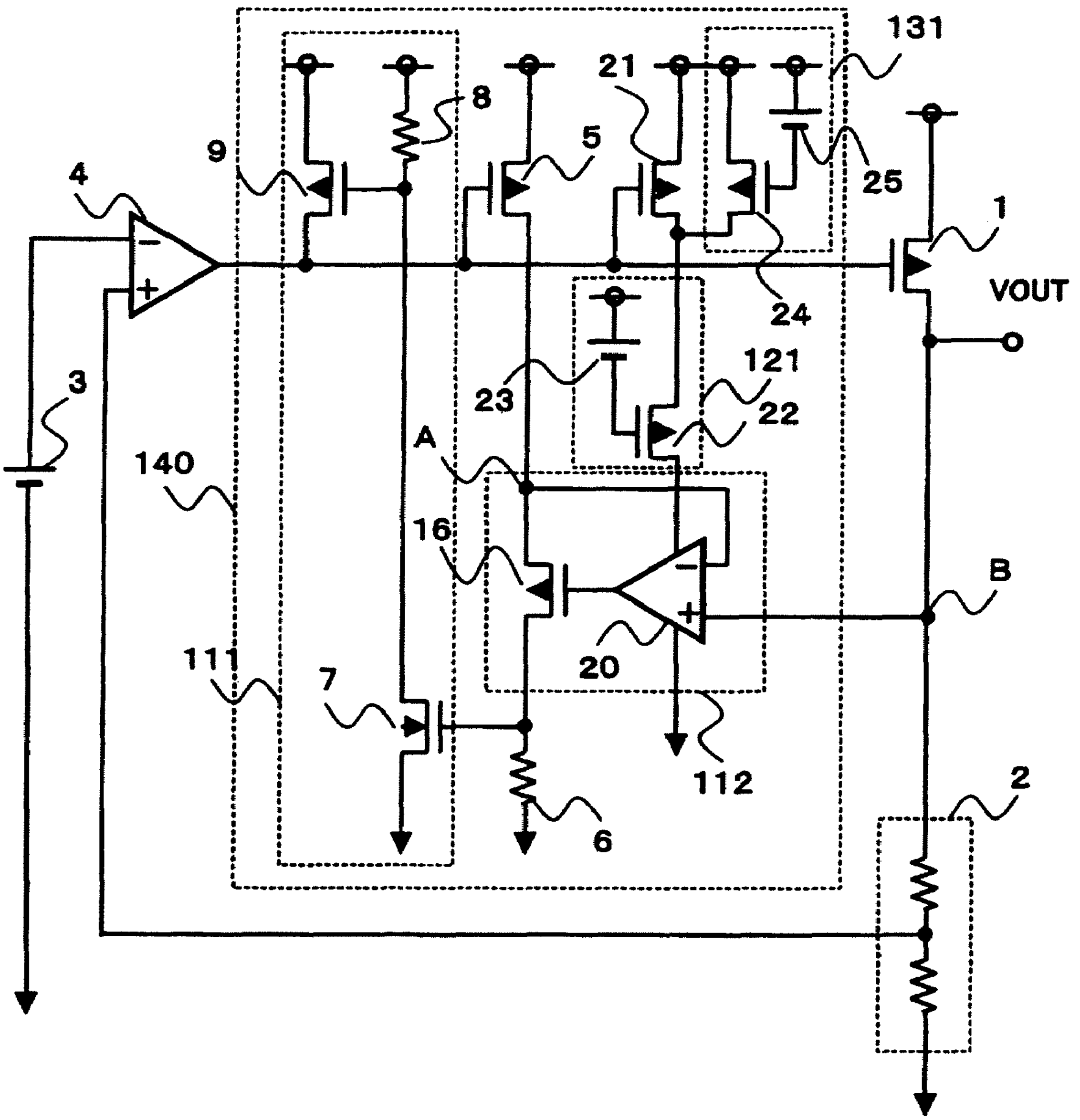
FIG. 4 a circuit diagram showing a voltage regulator having an overcurrent protective circuit according to yet still another embodiment.
Figure 5:
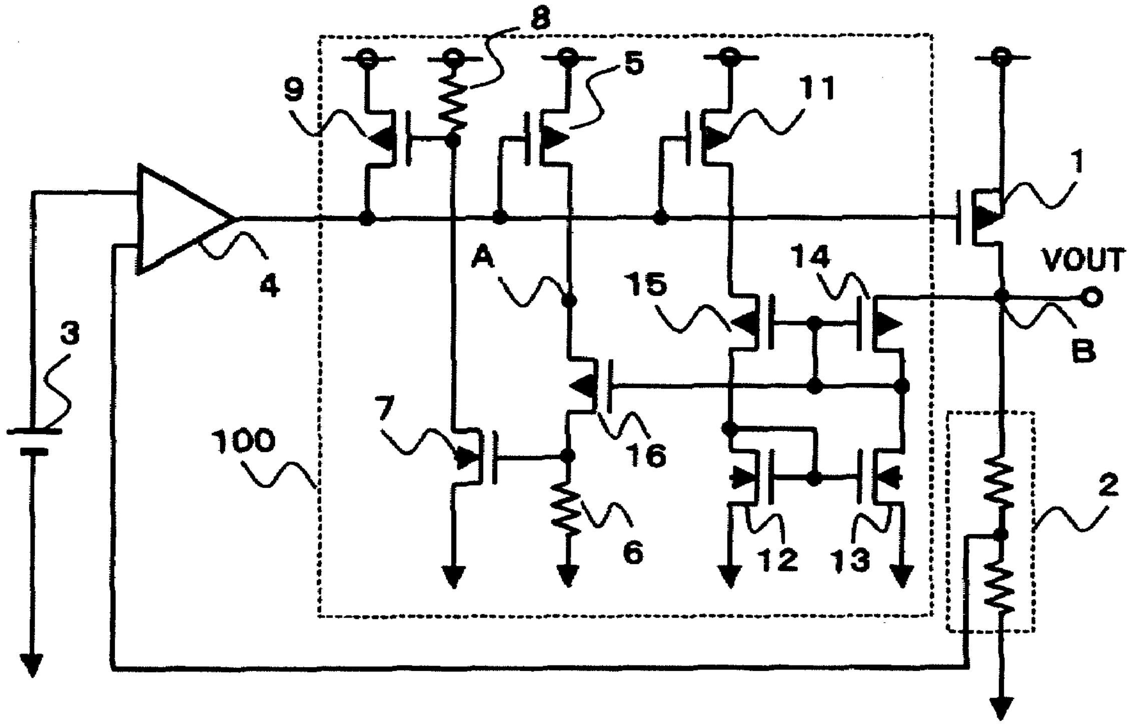
FIG. 5 PRIOR ART
FIG. 5 a circuit diagram showing a conventional voltage regulator having an overcurrent protective circuit.

Further, both the operating current upper limiter circuit 121 and the operating current lower limiter circuit 131 can be provided as in a voltage regulator according to still another embodiment shown in FIG. 4.

With the above configuration of the overcurrent protective circuit, the advantages of both of the circuits can be provided. As a result, it is possible to realize the overcurrent protective circuit that is more excellent in the detection precision and smaller in the current consumption.

As has been described above, according to the overcurrent protective circuit of the voltage regulator of this embodiment, the output current detection transistor 5 and the output transistor 1 always operate in the same state with the result that the detection precision is excellent. Also, the current that flows in the regulated cascade circuit 112 flows in only one path of the operating current supply transistor 21. This leads to such an advantage that the current consumption can be reduced as compared with the conventional art while the functions of the conventional art are kept.

Further, even if the current that flows from the output transistor 1 increases, and the current that flows from the operating current supply transistor 21 becomes in the overcurrent state that exceeds the operating current required for the regulated cascode circuit 112 in proportion to the increased current, the current is limited by the transistor 22. As a result, unnecessary current is prevented from flowing, and the current consumption can be reduced more.

Further, even if the current that flows from the output transistor 1 is reduced, and the current that flows from the operating current supply transistor 21 becomes lower than the operating current required for the regulated cascode circuit 112, the minimum operating current can be supplied by the transistor 24. For that reason, the operation of the regulated cascode circuit 112 is prevented from being unstable, and the output current detection transistor 5 and the output transistor 1 always operate in the same state with the result that the detection precision can be maintained.

What is claimed is:

1. A voltage regulator, comprising:

an error amplifier circuit that amplifies and outputs a difference between a divided voltage obtained by dividing a voltage which is output by an output transistor and a reference voltage to control a gate of the output transistor; and an overcurrent protective circuit which detects that an overcurrent flows in the output transistor to limit the current in the output transistor, wherein the overcurrent protective circuit comprises:

an output current detection transistor that is controlled by an output voltage of the error amplifier circuit, and allows a detection current to flow therein;

a detection resistor that generates a detection voltage by the detection current;

an output current limiter circuit that is controlled by the voltage of the detection resistor, and controls the gate voltage of the output transistor; and a regulated cascode circuit that is connected between the drain of the output transistor and the drain of the output current detection transistor, and makes a voltage at the drain of the output transistor equal to a voltage at the drain of the output current detection transistor.

2. A voltage regulator according to claim 1, wherein the operating current of the regulated cascode circuit is supplied by the operating current supply transistor that is controlled by the output voltage of the error amplifier circuit.

3. A voltage regulator according to claim 2, wherein the regulated cascode circuit further comprises a current limiter circuit that is connected in series to the operating current supply transistor, and the upper limit of the operating current is limited by the current limiter circuit.

4. A voltage regulator according to claim 2, wherein the regulated cascode circuit further comprises a minimum operating current supply circuit that is connected in parallel to the operating current supply transistor, and the minimum operating current is compensated by the minimum operating current supply circuit.

5. A voltage regulator according to claim 2, wherein the regulated cascode circuit further comprises a current limiter circuit that is connected in series to the operating current supply transistor, and a minimum operating current supply circuit that is connected in parallel to the operating current supply transistor, and wherein the upper limit of the operating current is limited by the current limiter circuit, and the minimum operating current is compensated by the minimum operating current supply circuit.

6. A voltage regulator according to claim 3 or 5, wherein the current limiter circuit is constituted by a first transistor having a gate connected with a first bias voltage source.

7. A voltage regulator according to claim 4 or 5, wherein the minimum operating current supply circuit is constituted by a second transistor having a gate connected with a second bias voltage source.

* * * * *